(12) United States Patent
Niu et al.

(10) Patent No.: US 9,156,960 B2
(45) Date of Patent: Oct. 13, 2015

(54) DUST SEPARATING AND CARRIER RETURNING DEVICE

(75) Inventors: Bin Niu, Shandong (CN); Xiaolu Niu, Shandong (CN)

(73) Assignee: JINAN YOUBANG HENGYU SCIENCE AND TECHNOLOGY DEVELOPMENT CO., LTD., Shandong (CN)

(*) Notice: Subject to any disclaimer, the term of this patent is extended or adjusted under 35 U.S.C. 154(b) by 125 days.

(21) Appl. No.: 14/125,224

(22) PCT Filed: Aug. 30, 2011

(86) PCT No.: PCT/CN2011/079125
§ 371 (c)(1),
(2), (4) Date: Mar. 12, 2014

(87) PCT Pub. No.: WO2012/167512
PCT Pub. Date: Dec. 13, 2012

(65) Prior Publication Data
US 2014/0186233 A1        Jul. 3, 2014

(30) Foreign Application Priority Data

Jun. 10, 2011    (CN) .......................... 2011 1 0155771

(51) Int. Cl.
  *C08J 11/12*    (2006.01)
  *C08J 11/10*    (2006.01)
  *C10G 1/10*    (2006.01)
(52) U.S. Cl.
  CPC   *C08J 11/12* (2013.01); *C08J 11/10* (2013.01); *C10G 1/10* (2013.01)
(58) Field of Classification Search
  CPC ....................................... C08J 11/12

USPC ............ 422/209; 201/12; 202/100, 108, 117, 202/118, 131, 136, 208, 216, 249
See application file for complete search history.

(56) References Cited

U.S. PATENT DOCUMENTS

2010/0282590 A1*  11/2010  Niu .............................. 202/118

FOREIGN PATENT DOCUMENTS

| CN | 101074385 | 11/2007 |
|----|-----------|---------|
| CN | 101220285 | 7/2008 |
| CN | 201201932 | 3/2009 |
| CN | 101469270 | 7/2009 |
| DE | 199 50 042 | 4/2001 |
| JP | 2002-212570 | 7/2002 |

* cited by examiner

*Primary Examiner* — Walter D Griffin
*Assistant Examiner* — Huy-Tram Nguyen
(74) *Attorney, Agent, or Firm* — Nixon & Vanderhye P.C.

(57) ABSTRACT

Disclosed is a dust separating and carrier returning device, which comprises: an outer raw material transfer passage (1) and an inner carrier returning passage (2), and a sieve cage (4) with one end thereof connected with the raw material transfer passage (1) and the other end sealed; a spiral conveyer belt is provided between the sieve cage (4) and the carrier returning passage (2), with the two sides thereof connected to the inner wall of the sieve cage (4) and the outer wall of the carrier returning passage (2); and the end of the spiral conveyer belt is connected to the rear port of the carrier returning passage (2) via a guide plate (5). The above device achieves the dedusting of the carrier during the transmission process and the returning of the dedusted carrier to another working circle, thereby improving work efficiency and reducing the number of manufacturing process steps which in turn reduces the process cost.

6 Claims, 4 Drawing Sheets

DUST SEPARATING AND CARRIER RETURNING DEVICE

This application is the U.S. national phase of International Application No. PCT/CN2011/079125 filed 30 Aug. 2011 which designated the U.S. and claims priority to CN Patent Application No. 201110155771.4 filed 10 Jun. 2011, the entire contents of each of which are hereby incorporated by reference.

FIELD OF THE INVENTION

The invention relates to a type of dust separating and carrier returning device.

BACKGROUND TECHNOLOGY

Currently, in the continuously cracking technology of rubber or plastic, in order to realize the continuous cracking of rubber or plastic, the solid heat carriers with heat is often adopted to mix with and move in the same direction with raw materials in the cracking reactor, whereby the raw materials are heated. Usually, after fulfilling the cracking process, the surface of the solid heat carriers is attached with some dust consisting of solid objects after cracking; in order not to affect the next step of cracking, the solid heat carriers with dust on surface are usually discharged directly out of the cracking reactor, and continue to be used after dedusting treatment, which cannot only affect the processing efficiency, but also increase the processing cost substantially.

CONTENT OF THE INVENTION

To solve the above problems lying in the existing technology, the invention provides a dust separating and carrier returning device which can improve the processing efficiency and reduce the processing cost.

The invention is realized through the following technical solution: the dust separating and carrier returning device, which comprises an outer material transfer passage and an inner carrier returning passage, and a sieve cage with one end thereof connected with the material transfer passage and the other end sealed; a spiral conveyer belt is provided between the sieve cage and the carrier returning passage, with the two sides thereof connected to the inner wall of the sieve cage and the outer wall of the carrier returning passage; and the end of the spiral conveyer belt is connected to the rear port of the carrier returning passage via guide plates.

In this invention, materials mixed with the carriers are transported and cracked when passing through the material transfer passage. After cracking, carriers with solid dust adhered on the surface thereof continue to be conveyed, wherein the carriers with dust rub against each other to make the dust and carriers separated and then introduced into the sieve cage with the help of the spiral belt of the material transfer passage; dust can fall on the outside from the sieve cage, while with the assist of the spiral belt inside the sieve cage as well as the guide plate, the carriers enter into the middle carrier returning passage, back to the front of the equipment, and finally into the next working cycle.

In order to facilitate the carriers being exported smoothly through the material transfer passage and sent into the carrier returning passage, the stated guide plates comprise the import plates and the export plates, the import plates are connected with the spiral conveyor, the export plates correspond to the position of the carrier returning passage, and the import plates and the export plates are connected to each other, wherein the import plates are high in the front-end and low in the back-end, while the export plates are high in the front-end and low in the back-end. Through the guide plates, carriers can be exported smoothly through the material transfer passage and sent into the carrier returning passage.

For the convenience of dust removal, the invention has increased the number of spiral conveyor belts in the back-section of the material transfer passage. The increased spiral conveyor belts can shunt the conveyed carriers, whereby the distribution height of the carriers can be decreased that the carriers are diluted, which is more convenient for the discharge of the dust.

To facilitate discharging the oil gas generated from cracking, the backend of the sieve cage is in a mesh structure. The above-stated mesh structure of the backend of the sieve cage can be any structure form of the existing technology, however, in order to facilitate its maintenance, it is designed to be a detachable structure in the invention, namely: the backend section of the sieve cage is a backend cap connected with the sieve cage body which comprises a cap supporter and a mesh plate installed therein. When repairing, internal maintenance is available by removing the backend cap.

In order to facilitate collecting and exporting the dust sieved by the sieve cage, in the invention, a dust transfer passage with a spiral conveyor belt therein is arranged outside the sieve cage. The dust sieved by the sieve cage falls into the dust transfer passage outside the sieve cage, and is exported through the spiral conveyor belt arranged inside the dust transfer passage.

Beneficial effects of the invention lie in: the invention has realized dust removing for the carriers in the conveying process and returning the dedusted carriers for continuing into the next working cycle by arranging carriers returning passage in the material transfer passage as well as the arranged sieve cage and the guide plate. The structural design of the invention is smart, which can not only improve the work efficiency substantially, but also reduce the processing steps, thus reducing the processing cost greatly.

Figure 1:
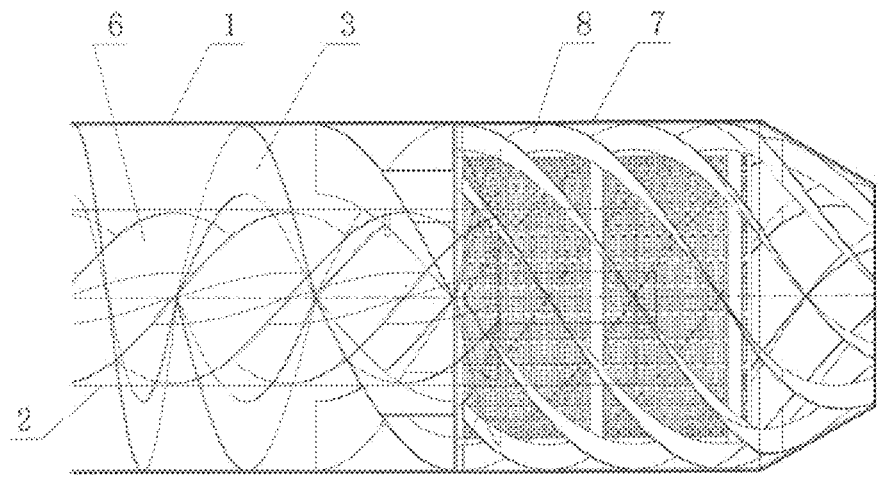
FIG. 1 shows the structure schematic of the embodiment 4 of the invention.
Figure 2:
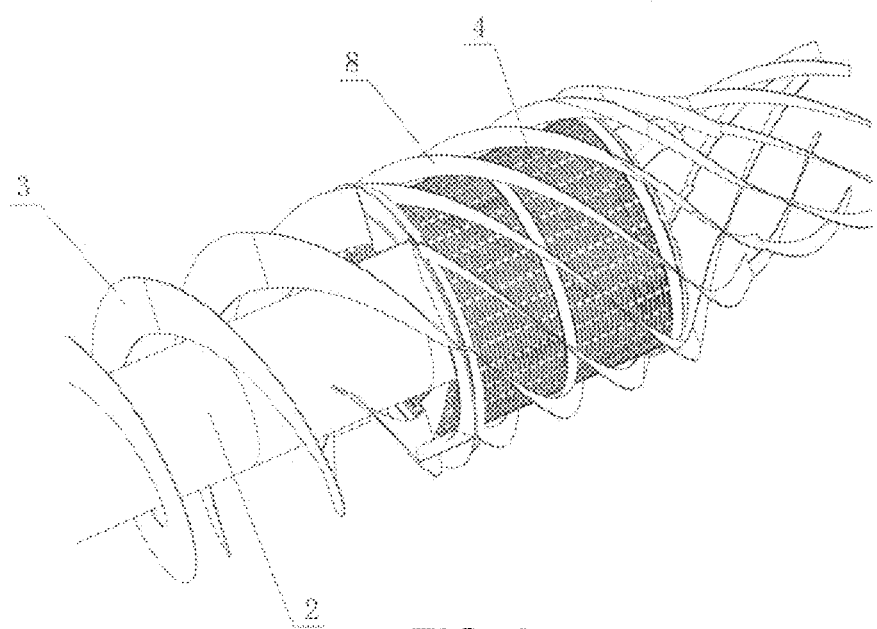
FIG. 2 shows the structure schematic of the embodiment 4 of the invention but without the material transfer passage and the dust transfer passage.
Figure 3:
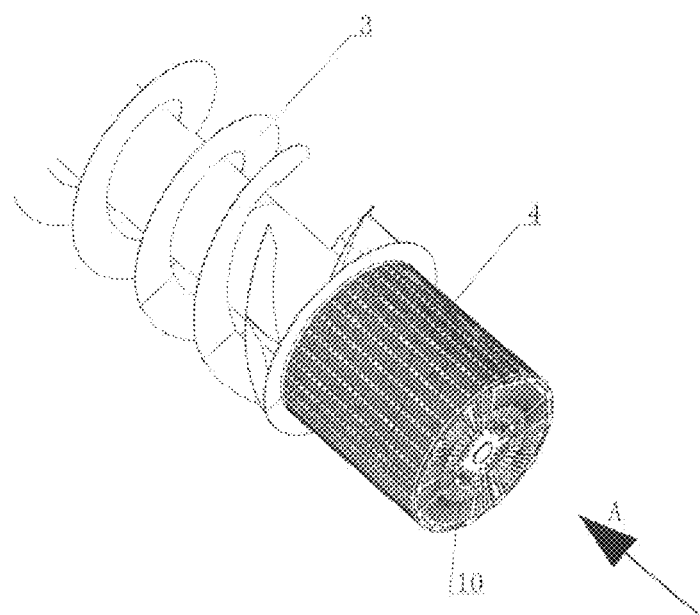
FIG. 3 shows the structure schematic of the sieve cage in FIG. 2 but without the dust conveying spiral belt.
Figure 4:
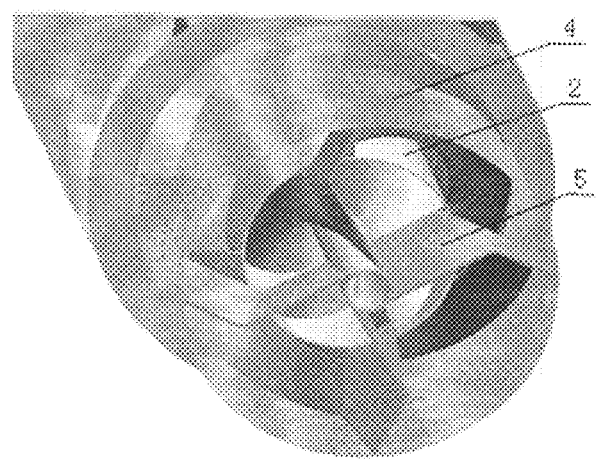
FIG. 4 shows the structure schematic of the A direction in FIG. 3 (but without the backend cap)
Figure 5:
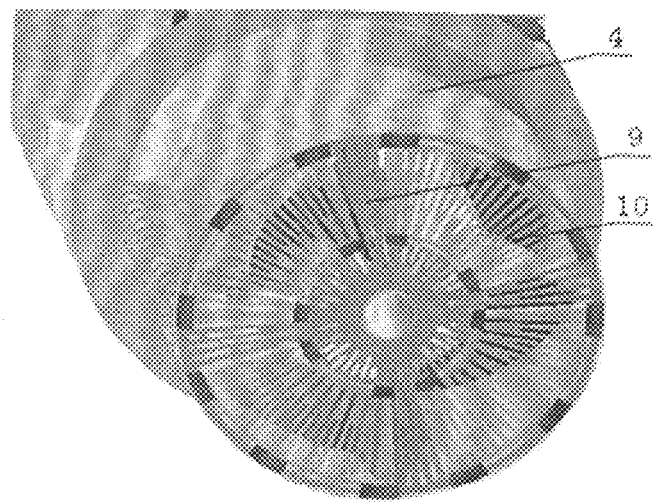
FIG. 5 shows the structure schematic of FIG. 4 with the backend cap.
Figure 6:
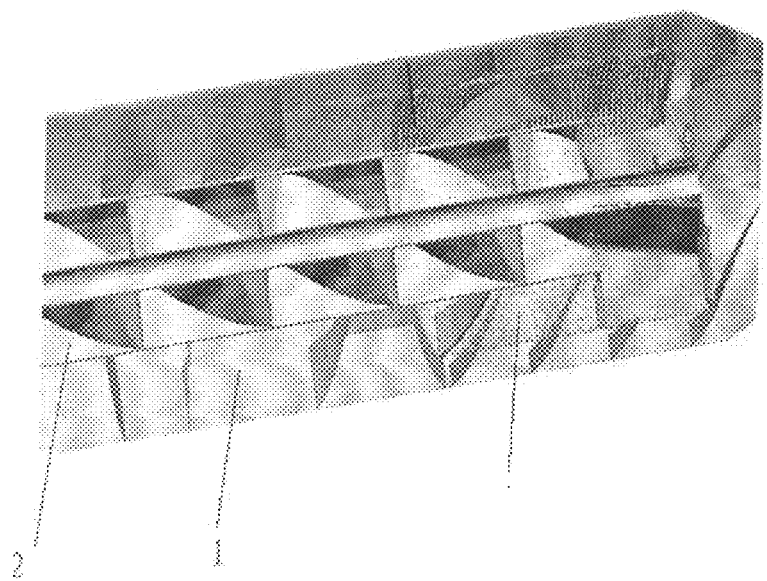
FIG. 6 shows the axial section structure schematic of the invention in the embodiment 4.
Figure 7:
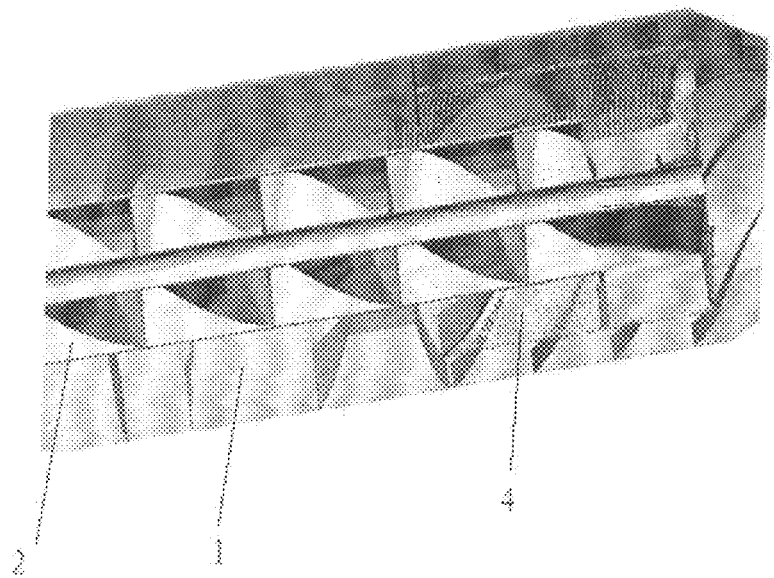
FIG. 7 shows the grayscale image of FIG. 6.

In this figure, 1 the material transfer passage, 2 the carrier returning passage, 3 the spiral conveyor belt of the material transfer passage, 4 the sieve cage, 5 the guide plate, 6 the spiral conveyor belt of the carrier returning passage, 7 the dust transfer passage, 8 the spiral conveyor belt of the dust transfer passage, 9 backend cap supporter, 10 mesh plate.

Specific Implementation Methods

Further instructions for the invention are carried out by the following nonrestrictive embodiments.

Embodiment 1

This embodiment comprises an outer material transfer passage and an inner carrier returning passage, and both of which are fitted with spiral conveyor belts inside; one end of the sieve cage is connected with the material transfer passage, and the other is sealed; a spiral conveyor belt whose two sides connect respectively with the inner wall of the sieve cage and the outer wall of the carrier returning passage is equipped between the sieve cage and the carrier returning passage; the end of the spiral conveyor belt is linked with the back port of the carrier returning passage through the guide plates.

When using, raw materials and the carriers are conveyed through the material transfer passage and the raw materials are cracked in the conveying process. After cracking, the surface of carriers are adhered with solid dust, and the carriers with dust rub against each other in the movement process to make the dust and carriers separated and then introduced into the sieve cage with the help of the spiral conveyor belt when passing through the material transfer passage; dust can fall on the outside from the sieve cage, while with the assist of the spiral conveyor belt inside the sieve cage as well as the guide plates, the carriers enter into the middle carrier returning passage, back to the front of the equipment, and finally into the next working cycle.

All the other parts of this embodiment adopt existing technologies, no more repeat herein.

Embodiment 2

This embodiment comprises an external material transfer passage and an internal carrier returning passage, and both of which are fitted with spiral conveyor belts inside; one end of the sieve cage is connected with the material transfer passage, and the other is sealed; a spiral conveyor belt whose two sides connect respectively with the inner wall of the sieve cage and the outer wall of the carrier returning passage is equipped between the sieve cage and the carrier returning passage; the end of the spiral conveyor belt is linked with the back port of the carrier returning passage through the guide plates. The stated guide plates comprise the import plates and the export plates, the import plates are connected with the spiral conveyor, the export plates correspond to the position of the carrier returning passage, and the import plates and the export plates are connected to each other, wherein the import plates are high in the front-end and low in the back-end, while the export plates are high in the front-end and low in the back-end.

Compared with the embodiment 1, this embodiment has improved the guide plates to facilitate the carriers being exported through the material transfer passage and sent into the carrier returning passage smoothly.

All the other parts of this embodiment adopt existing technologies, no more repeat herein.

Embodiment 3

This embodiment comprises an external material transfer passage and an internal carrier returning passage, and both of which are fitted with spiral conveyor belts inside; one end of the sieve cage is connected with the material transfer passage, and the other is sealed; a spiral conveyor belt whose two sides connect respectively with the inner wall of the sieve cage and the outer wall of the carrier returning passage is equipped between the sieve cage and the carrier returning passage; the end of the spiral conveyor belt is linked with the back port of the carrier returning passage through the guide plate, wherein the backend of the sieve cage is in a mesh structure.

In this embodiment, the backend of the sieve cage is designed in a mesh structure in order to facilitate discharging the oil gas generated in the cracking process. This mesh structure can be any structure form, however, when considering the convenience of its maintenance, it can be designed to be a detachable structure like: the backend section of the sieve cage is a backend cap connected with the sieve cage body which comprises a cap supporter and a mesh plate installed therein.

All the other parts of this embodiment adopt existing technologies, no more repeat herein.

Embodiment 4

This embodiment comprises the external material transfer passage 1 and the internal carrier returning passage 2, and both the material transfer passage 1 and the carrier returning passage 2 are fitted with spiral conveyor belts inside, which refer to the spiral conveyor belt 3 and the spiral conveyor belt 6 respectively; one end of the sieve cage 4 is connected with the material transfer passage 1, and the other is sealed; a spiral conveyor belt whose two sides connect respectively with the inner wall of the sieve cage 4 and the outer wall of the carrier returning passage 2 is equipped between the sieve cage 4 and the carrier returning passage 2; the end of the spiral conveyor belt is linked with the back port of the carrier returning passage 2 through the guide plates 5. The stated guide plates comprise the import plates and the export plates, the import plates are connected with the spiral conveyor, the export plates correspond to the position of the carrier returning passage, and the import plates and the export plates are connected to each other, wherein the import plates are high in the front-end and low in the back-end, while the export plates are high in the front-end and low in the back-end. In the external part of the sieve cage 4, the dust transfer passage 7 is arranged, in which a spiral conveyor belt 8 is arranged. The backend section of the sieve cage 4 is fitted with a backend cap connected with the sieve cage 4 body which comprises the cap supporter 9 and the mesh plate 10 installed therein.

This embodiment has on the basis of the embodiment 1 made further improvement for the guide plates in order to facilitate the carriers being exported from the material transfer passage and sent into carrier returning passage smoothly, meanwhile, it has improved the external structure of the sieve cage to collect and export the dust sieved thereby, to facilitate the environment keeping clean. Besides, in this embodiment, a detachable mesh structure is adopted in the backend of the sieve cage, while facilitating discharging the oil gas generated from cracking, it is convenient for maintenance as well.

All the other parts of this embodiment adopt existing technologies, no more repeat herein.

Embodiment 5

This embodiment is the improvement on the material transfer passage based on any condition of the above-stated embodiments 1-4. Wherein it increases the number of the spiral conveyor belts in the back-section of the material transfer passage. The number of the increased spiral conveyor belts can be two or four or other numbers. Increasing the number of the spiral conveyor belts can shunt the conveyed carriers in the back-section of the material transfer passage, whereby the distribution height of the carriers can be decreased so that the carriers are diluted, which is more convenient for the discharge of the dust.

The invention claimed is:

1. A dust separating and carrier returning device comprising: an outer material transfer passage and an inner carrier returning passage, and a sieve cage with one end thereof connected with the material transfer passage and the other end sealed; a spiral conveyer belt is provided between the sieve cage and the carrier returning passage, with the two sides thereof connected to the inner wall of the sieve cage and the outer wall of the carrier returning passage; and the end of the spiral conveyer belt is connected to the rear port of the carrier returning passage via guide plates.

2. The dust separating and carrier returning device of claim 1, wherein the guide plates comprise import plates and export plates, the import plates are connected with the spiral conveyor, the export plates correspond to the position of the carrier returning passage, and the import plates and the export plates are connected to each other, wherein the import plates are high in the front-end and low in the back-end, while the export plates are high in the front-end and low in the back-end.

3. The dust separating and carrier returning device of claim 1, wherein it increases the number of the spiral conveyor belts in the back-section of the material transfer passage.

4. The dust separating and carrier returning device of claim 1, wherein the back-end of the sieve cage is in a mesh structure.

5. The dust separating and carrier returning device of claim 4, wherein the backend section of the sieve cage is a back-end cap connected with the sieve cage body which comprises a cap supporter and a mesh plate installed therein.

6. The dust separating and carrier returning device of claim 1, wherein a dust transfer passage is arranged in the external part of the sieve cage, a spiral conveyor belt is arranged in the dust transfer passage.

* * * * *